April 13, 1954     E. C. PINSENSCHAUM     2,675,117
ARTICLE FEEDING APPARATUS FOR AUTOMATIC MACHINES
Filed Feb. 11, 1950                        4 Sheets-Sheet 1
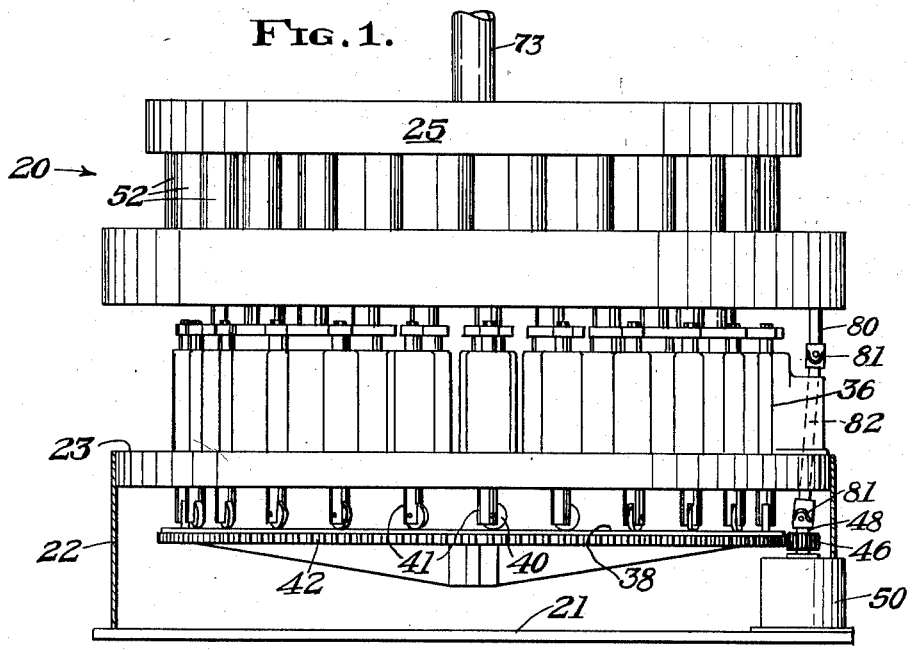
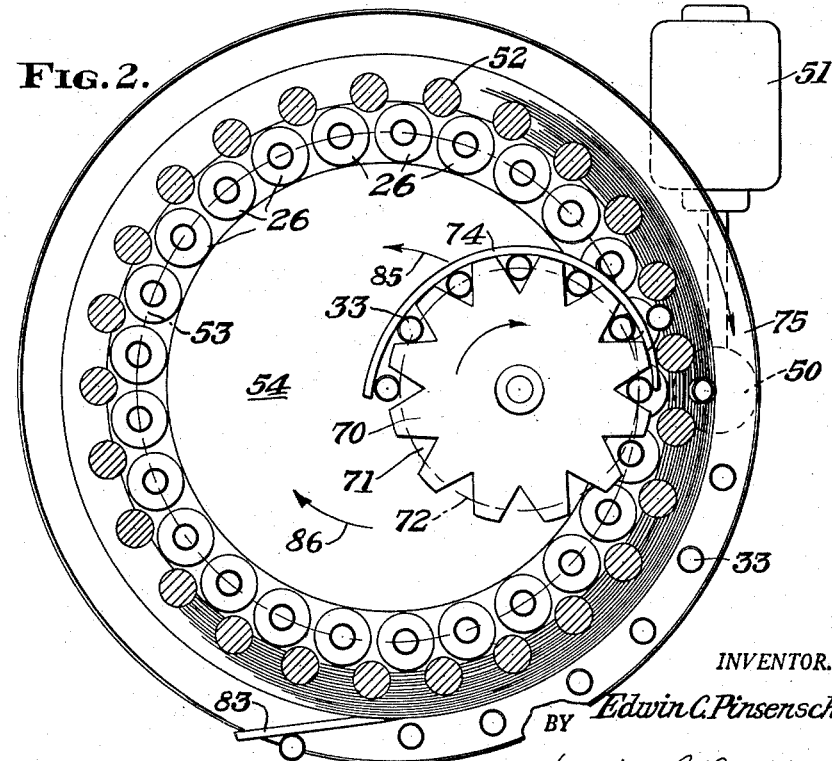
INVENTOR.
Edwin C. Pinsenschaum
BY
Herschel C. Omohundro
Attorney

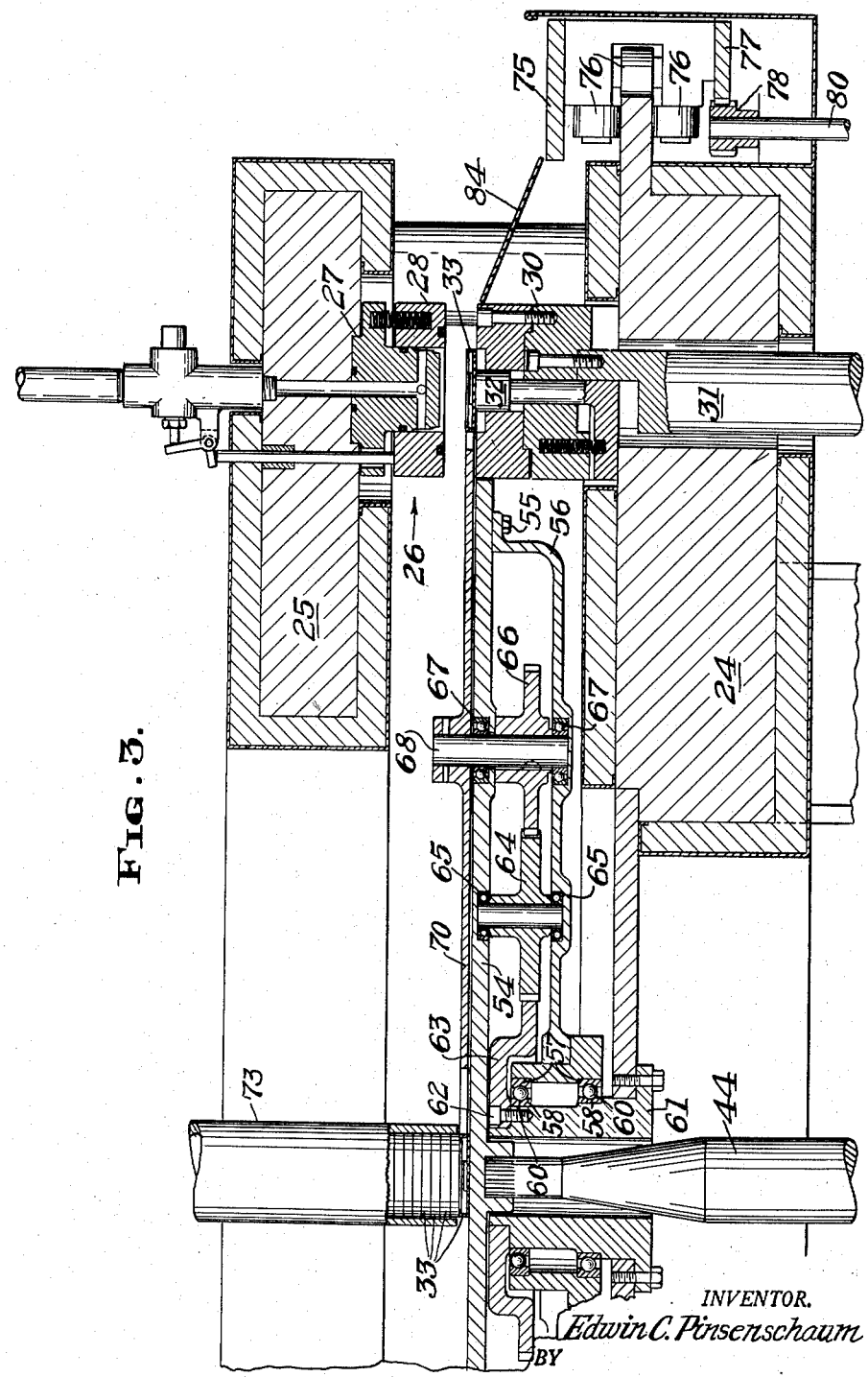

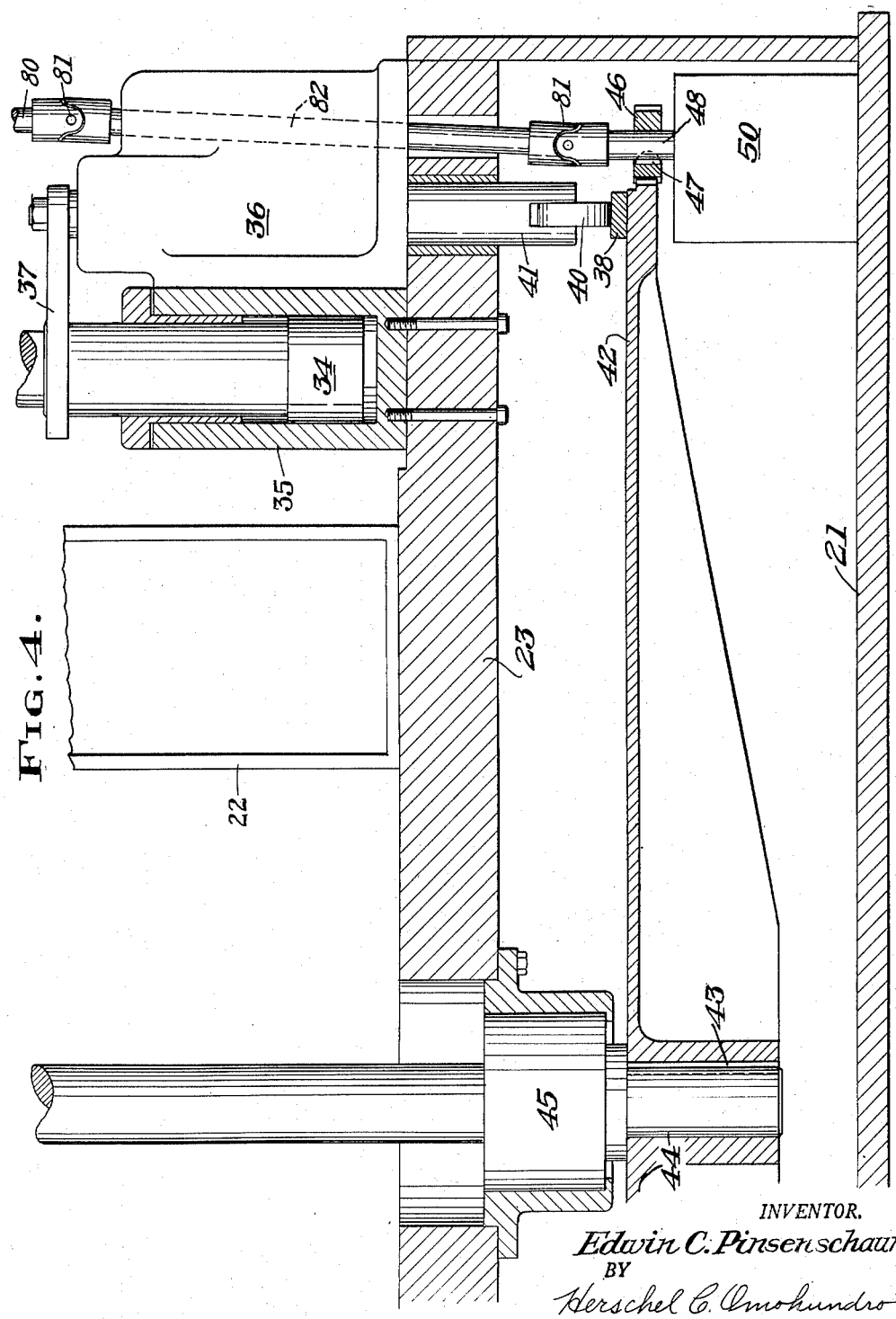

Patented Apr. 13, 1954

2,675,117

UNITED STATES PATENT OFFICE 2,675,117

ARTICLE FEEDING APPARATUS FOR AUTOMATIC MACHINES

Edwin C. Pinsenschaum, Columbus, Ohio, assignor to The Denison Engineering Company, Columbus, Ohio, a corporation of Ohio Application February 11, 1950, Serial No. 143,680

10 Claims. (Cl. 198—22)

1

This invention relates generally to automatic machinery and more particularly to mechanism for feeding articles to such machinery to have operations performed thereon.

An object of this invention is to provide a mechanism for feeding articles at a rapid rate to an automatic machine whereby the production rate of the machine will be increased, one adaptation of the invention being in the manufacture of sealing caps for glass jars of the type in which food is processed, stored and distributed.

Another object of this invention is to provide a feeding apparatus in which the articles to be operated upon will be supplied to a loading station and a rotatable transfer member will move them from the loading station to the mechanism for performing operations thereon, the transfer member being so designed and operated that the articles will be moved laterally from the loading station toward the operating mechanism at a uniformly decelerated rate so that at the instant the article is in registration with the operating mechanism, the lateral motion thereof will be discontinued and the article will be permitted to remain in position to be operated upon by such mechanism.

Still another object of this invention is to so construct the feeding mechanism mentioned in the preceding paragraph, that the transfer member will rotate at a uniform rate and still not dislodge or otherwise affect the articles deposited in registration with the operating mechanism.

A further object of the invention is to provide a feeding mechanism having a disk-like transfer member provided with a plurality of article-receiving pockets or recesses, the transfer member being arranged to, in effect, roll along a row of working heads and register a pocket with each of such heads, the arrangement and rate of movement of the transfer member being such as to reduce the relative movement between the transfer member and a selected working head to a minimum when a pocket in the transfer member is in registration with such selected working head.

A still further object of the invention is to provide a feeding mechanism for an automatic machine having a series of working heads arranged in circular order, the feeding mechanism having a manifold for holding articles to be fed to the working heads, the manifold being located at the center of the circle of working heads, and a disk-like transfer member for moving the articles one at a time from the manifold to the working heads, the transfer member being rotated about an axis which is in turn revolved about the center of the circle of working heads, motion transmitting mechanism being provided to cause the transfer member to move as though it were rolling around the circle of working heads so that article-receiving pockets on such transfer member will be brought into registration with successive working heads where they will deposit an article to be operated upon, the feeding mechanism also having suitable means for removing articles, previously operated upon, from points in registration with the working heads before depositing other articles at such points.

Another object is to provide a feeding mechanism for an automatic machine, which feeding mechanism includes a transfer member of disk-like form having spaced V-shaped notches or recesses which register, first, with a magazine at a loading station and then with working heads on the automatic machine as the transfer member revolves on an axis which in itself moves along a row of working heads, the feeding mechanism having a suitable motion-transmitting system to cause the transfer member and its axis to move at the proper rate to insure the registration of the notches or recesses with the working heads as the transfer member passes the same, the feeding mechanism also having a guard or retainer member for maintaining the articles in the recesses during their transfer from the loading station to the working heads, the retainer serving a dual purpose by effecting the removal of finished articles from registration with the working heads.

It is another object of this invention to provide the feeding mechanism mentioned in the preceding paragraph with means for collecting and moving the finished articles to a discharge station, the collecting means consisting, in one form of the invention, of a rotatable collector ring surrounding the circle of working heads and means for driving the ring in a manner to prevent interference between the finished articles during their movement from the machine.

In the drawings:

Figure 1 is a side elevational view partly in section of an automatic machine to which a feeding mechanism formed in accordance with the present invention has been applied.

Figure 2 is a horizontal sectional view taken through the automatic machine shown in Figure 1 on the plane indicated by the line II—II of Figure 1.

Figure 3 is a vertical transverse sectional view taken through the upper portion of the automatic machine on the plane indicated by the line III—III of Figure 2.

Figure 4 is a similar view taken through the lower portion of the machine, the view being taken on the same plane as Figure 3.

Figure 5:
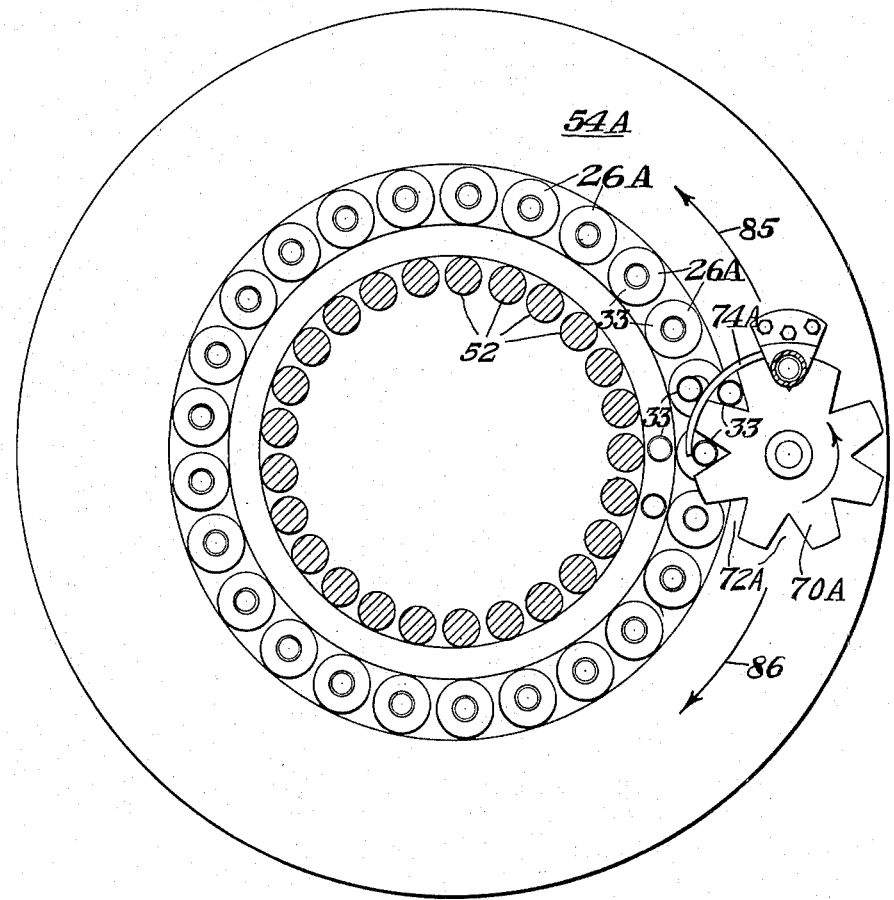
Figure 5 is a horizontal sectional view taken through an automatic machine provided with a modified form of article feeding or removing apparatus.

Referring more particularly to the drawings, the numeral 20 designates the automatic machine to which the invention has been applied in its entirety. This machine includes a stationary base 21, a frame 22 mounted on the base, a lower horizontal supporting body 23, an intermediate horizontal supporting body 24 and an upper horizontal body 25, these bodies all being stationary. The machine is provided with a plurality of sets of cooperative tooling, designated generally by the numeral 26, for performing operations on articles which the machine has been designed to produce. In the present instance the automatic machine shown has been designed to apply a protective lining material to metallic caps employed in sealing the mouths of jars or similar containers used for the preservation, storage and distribution of foods.

The tooling 26 includes an upper die 27 which is rigidly carried by the support 25, a stripping ring 29 surrounding a portion of the die 27 and disposed for limited movement relative thereto. A bottom die member 30 which is mounted on the upper end of a plunger 31 for movement toward and away from the die 27 and an ejector 32 carried by the die portion 30 for limited movement relative thereto to effect the withdrawal of the article, designated in this instance by the numeral 33, from the die member 30. The present invention is directed to apparatus for feeding articles such as cap 33 to apparatus for performing operations thereon, such as, the die mechanism shown. The latter mechanism does not form a part of the invention, but has been disclosed in this application merely for the purpose of facilitating an understanding of the invention. The description of the automatic machinery will therefore be restricted to that necessary to a complete understanding of the feeding mechanism. The claims which follow the specification will be restricted to the feeding mechanism.

The plunger 31 is guided for movement through the support 24 and extends downwardly and is attached to a piston 34 forming a part of a power cylinder 35. Suitable means, not shown, are provided to supply operating fluid to the power cylinder to effect the movement of the piston. In the operation of moving the die parts together to perform an operation on the cap 33, then in position between the die elements, this supply of fluid is controlled by a servo valve 36 which is operated in part by the piston 34 through the connection 37 and in part by a cam 38 through a follower 40 and push rod 41. The cam 38 is carried by a large gear 42 which is keyed as at 43, to a shaft 44 extending upwardly through the center of the machine 20. Suitable bearings 45 are provided to rotatably support the shaft in the machine frame. The gear 42 is driven by a pinion 46 keyed as at 47, to a shaft 48 extending from a transmission 50. Power is supplied to the transmission by an electric motor 51, or, other suitable prime mover. Hereafter in this description, the die members and their associated elements will be referred to collectively, as working heads.

As shown in Figure 2, a plurality of these working heads are provided, these being arranged in a circle in uniformly spaced order. Columns 52 are arranged between the supporting members 24 and 25, these columns being also arranged in spaced circular order outside of the working heads 26. It is within the concept of the invention to provide the columns 52 in other locations, for example, within the circle of working heads, and to arrange feeding mechanism exteriorly of the working heads as illustrated in Figure 5, instead of within the circle as shown in Figures 1 to 4, inclusive. The circle on which the working heads are arranged, is indicated by a dot and dash line identified in the drawings generally by the numeral 53. This circle has been shown and given a reference numeral for a purpose, which will be apparent from the following description. From the foregoing, it will be apparent that as the piston 34 moves up and down in the power cylinder 35, the die elements will be moved toward and away from one another to perform an operation on an article positioned therebetween.

This invention relates to mechanism for feeding articles to the working heads in a quick, simple manner and removing such articles from between the die parts after an operation has been performed thereon. The feeding mechanism comprises a supporting member 54, which in this instance, is circular in form and has a splined connection with the upper end of the shaft 44, so that it will rotate in unison therewith. To the under side of the support 54 there is secured by screws 55, a dish-like member 56, which adjacent its center has the outer races 57 of anti-friction bearings 58 secured thereto, the inner races 60 of these bearings being stationarily secured to a sleeve member 61 carried by the stationary supporting member 24. The sleeve 61 also has secured thereto by screws 62, a gear member 63, the teeth of which are disposed in meshing engagement with an idler gear 64, this gear being journalled for rotation in bearings 65 provided in the opposed surfaces of the support 54 and dish-like member 56. This idler gear 64 has its teeth also in meshing engagement with the teeth of a driven gear 66 which is journalled in registering bearings 67 also provided in the members 54 and 56, gear 66 being keyed to a shaft 68. The upper end of this shaft projects above the support 54 and has a disk-like transfer element 70 secured to and supported thereby.

As shown in Figure 2, the transfer element 70 has a series of V-shaped notches, or, recesses 71 formed in its periphery, these notches extending radially into the disk and being uniformly spaced throughout the circumference thereof. The notches, or recesses 71, receive and locate the articles, in this instance caps 33, to be fed to the working heads. The sides of the notches, are so calculated that when the caps, or other articles 33 are properly positioned therein, the centers of the caps will be disposed in a circle indicated by a dot-and-dash line identified by the numeral 72. It will be noted from Figure 2 that the circle 72 lies within the circle 53 and is tangent thereto at one point, at all times. The gears 63, 64 and 66, are so calculated that when the shaft 44 is revolved to rotate the member 54, the axis of rotation of the transfer member 70 will swing around the axis of the shaft 44 and the transfer member will be caused to revolve to provide the effect of the circle 72 rolling around the circle 53. The recesses 71 are so spaced on the transfer member 70, that each recess will coincide, or, register with a working head as the transfer member moves past such head.

Since the circle 72 rolls on the circle 53, the recesses will be substantially stationary with respect to its particular working head when the axis of the transfer member is on a line between the center of the machine and the particular working head. Due to this arrangement, articles will be moved from the loading station at the center of the machine in the first form of the invention illustrated to the working heads with a uniformly decelerated motion and will come to rest when in registration with a working head. This manner of feeding will take place even though the transfer member rotates continuously about its axis and such axis moves continuously around the axis of the shaft 44.

The machine is provided with a manifold 73 located in the center of the machine and extending vertically above the support 54. As the transfer member 70 rotates, the articles, or, caps 33 will be removed, one at a time, from the bottom of the stack contained within the manifold 73 and moved toward the row of working heads by the transfer member 70. Each cap will be positioned in a recess 71 and retained therein by an arcuate guard, or, retainer strip 74 extending around the forward edge of the transfer member 70. This guard, or, retainer 74 serves a dual purpose in that, in addition to preventing the movement of the caps 33 from the recesses by centrifugal force, it also dislodges the formed cap members from between the die elements prior to the deposition of another article therein. This operation is disclosed in Figure 2 wherein the outer end portion of the guard 74 has dislodged a cap and is pushing the same outward from between the die members through a space between adjacent columns 52.

It should be obvious that as the support 54 revolves and the member 70 does likewise each working head will receive a cap; that the cap will be moved swiftly from the loading station toward the working head, but due to the fact that the transfer member is in effect rolling on the circle in which the working heads are arranged, the lateral motion of the cap relative to the machine will cease when the center of the cap is disposed on such circle. The continued movement of the member 54 and transfer element withdraws the latter from the cap permitting the cap to remain in position between the die parts. After the transfer member has moved beyond a working head, fluid may be supplied to the power cylinder 35 for such working head to cause a forming operation to be performed on the cap.

As mentioned above, the particular machine illustrated has been designed to apply the protective coating to the interior surface of the cap 33. The die members may, therefore, be heated so that the protective coating will be softened and cured, the die members being retained in a cap-squeezing condition during this period.

In the event, the cured period is not required, it is within the concept of the invention to provide a plurality of mechanisms adjacent the center of the machine and to duplicate the transfer element 70, so that more than one working head could be supplied with articles substantially simultaneously.

To collect the finished articles as they are discharged from the working heads, there has been provided a collector ring, or, conveyor 75 which extends around the outside of the machine. This ring is supported for rotation by a plurality of rollers 76 carried by the ring and engaging the edge of the support 24. The ring 75 is also provided with a ring gear 77, the teeth of which are disposed in meshing engagement with those of a pinion 78. This pinion is carried by a shaft 80 which is connected by universal connections 81 and a connecting rod 82 with the shaft 48 of the transmission 50, the driving connection between the ring 75 and the transmission is such that the ring 75 will rotate in a direction opposite to the direction of movement of the support 54. Suitable means such as a guard 83 may be provided to remove the articles 33 from the conveyor 75 at a suitable point of discharge. When the articles are dislodged from the working heads, they will slide down an inclined surface 84 to the conveyor ring 75.

In the modified form of the invention shown in Figure 5, the transfer member 70A is disposed exteriorly of the row of working heads 26A. This transfer member is carried by a ring-like support 54A which also carries a manifold 73A for receiving a stack of articles and a guard 74A for retaining the articles in the recess of the transfer member as they are moved from the loading station to positions in registration with the working heads. The principle of this form of the invention is the same as that in the first form described, in that the circle in which the articles are held in the transfer member, rolls on the circle in which the working heads are arranged. The spacing of the article-receiving recess in the transfer member in the modified form of the invention is the same as the space between the working heads. It should be obvious that the modified form of the invention will operate in the same manner as the form of the invention first described.

In the description thus far, the transfer member and its associated mechanism has been designated as a feeding device. When the supports 54 or 54A are moved in the direction of the arrow 85 feeding operations will result. It is important to note, however, that without changing the feeding mechanism in any way except to make provisions at the "heretofore-termed" loading station for the removal of articles, the feeding mechanism may be converted into an unloading mechanism merely by reversing the direction of movement of the supports 54 or 54A. When these members are moved in the reverse direction, indicated by the arrow 86, the transfer members or disks will also revolve in reverse direction and they will remove the articles one at a time from registration with the working heads. These articles will be moved, in the first form of the invention illustrated, to the center of the machine and to the outer side of support 54A in the second form of the invention illustrated. As mentioned above suitable means such as an opening through which the articles may drop, may be provided for collecting the articles removed in this manner. When the mechanism is operated in a reverse direction, the guards 74 or 74A retain the articles in the recesses of the transfer member as before.

While the forms of embodiment of the present invention as herein disclosed constitute preferred forms, it is to be understood that other forms might be adopted, all coming within the scope of the claims which follow.

I claim:

1. Article feeding apparatus comprising a substantially flat support; a stationary loading manifold disposed substantially normal to said support for receiving articles to be fed; a rotatable transfer member supported for movement in a plane parallel to said support and having a series of article-receiving recesses disposed in a circle about the center of rotation thereof, said center of rotation being arranged eccentrically with respect to said loading manifold to successively register said recesses with said manifold upon rotation of said transfer member; and means for simultaneously moving said transfer member about the center of said loading manifold and revolving said transfer member about the center of said circle of article-receiving recesses.

2. Article feeding apparatus comprising a substantially flat support; a stationary loading manifold disposed substantially normal to said support for holding articles to be fed; a transfer member supported for rotation in a plane parallel to said support and having a series of article-receiving recesses disposed in a circle, the center of such circle being arranged eccentrically with respect to said loading manifold; and motion transmitting means for swinging said transfer member about an axis passing through the loading manifold and rotating said transfer member about the center of the circle of article-receiving recesses to successively register the recesses with said loading manifold and successively position the recesses on a circle concentric with the path of swinging movement of said transfer member.

3. Article feeding apparatus comprising a rotatable support; a loading manifold disposed in registration with the axis of rotation of said support; a transfer member supported for rotation on said support about an axis spaced from the axis of rotation of said support, said transfer member having a series of recesses disposed in a circle about the axis of rotation of said transfer member; and means for rotating the support in one direction to move the transfer member about the axis of rotation of said support and rotating the transfer member in the opposite direction to successively register the recesses with the loading manifold and successively position the recesses at points disposed equidistantly from the axis of rotation of said support.

4. Article feeding apparatus comprising a support mounted for rotation about an axis; a loading manifold registering with said axis for holding articles to be fed; a transfer disk disposed for rotation on said support about an axis spaced from the first-mentioned axis, said disk having spaced recesses in the outer peripheral portion thereof, each recess registering with said loading manifold upon rotation of said disk; and gear means between said support and disk, said gear means being operative upon rotation of said support in a predetermined direction to revolve said disk in the opposite direction to successively dispose the recesses in the disk at equal distances from the axis of rotation of said support.

5. Article feeding apparatus comprising a support mounted for rotary movement about an axis; a loading device registering with said axis for holding articles to be fed; a transfer member journaled for rotation on said support about an axis spaced from the axis of rotation of said support, said transfer member having a series of recesses successively registering with said loading device upon rotation of said transfer member; a fixed gear adjacent said support and gears on said support and transfer member, said gears being in meshing relationship and serving upon rotation of said support to revolve said transfer member to successively position the recesses therein on a circle concentric with the axis of rotation of said support.

6. Article feeding apparatus comprising a support mounted for rotary movement about an axis; a loading device registering with said axis for holding articles to be fed; a transfer member journaled for rotation on said support about an axis spaced from the axis of rotation of said support, said transfer member having a series of recesses opening toward the outer edge thereof, said recesses successively registering with said loading device upon rotation of said transfer member; a guide on said support adjacent the periphery of said transfer member; means for rotating said support about its axis, said transfer member moving with said support; and means for rotating said transfer member in a direction opposite that of said support while moving with said support, said transfer member serving to successively remove articles from said loading device and deposit them on a circle concentric with the axis of rotation of said support.

7. Article feeding apparatus comprising a support mounted for rotary movement about an axis; a loading device registering with said axis for holding articles to be fed; a transfer member journaled for rotation on said support about an axis spaced from the axis of rotation of said support, said transfer member having a series of recesses opening toward the outer edge thereof, said recesses successively registering with said loading device upon rotation of said transfer member; a guide on said support, said guide extending from a point adjacent said loading device around a portion of the periphery of said transfer member to a point on the side thereof opposite said loading device; and means for rotating said support and said transfer member in timed relationship to cause the latter to move in a circle around said loading device while rotating in the opposite direction from said support, said transfer member serving to successively remove articles from said loading device and deposit them on a circle concentric with the axis of rotation of said support, said guide serving to displace articles previously deposited on said circle.

8. A feeding mechanism comprising a loading manifold; means providing a plurality of horizontally fixed pockets disposed in spaced relation on a circle concentric with the center of said loading manifold; a transfer member having a plurality of recesses disposed in a circle arranged tangent to and within the circle of said pockets; a support for said transfer member; and means for moving said support about the center of said loading manifold and said transfer member about the center for said circle of recesses.

9. A feeding mechanism comprising a loading manifold; means providing a plurality of horizontally fixed receivers disposed in spaced relation on a circle concentric with the center of said loading manifold; a transfer member having a plurality of article-receiving recesses disposed in spaced relation on a circle arranged tangent to and within the circle of said receivers, the chordal spacing of said recesses being equal to the chordal spacing of said receivers, the diameter of the circle for said recesses being such as to dispose a recess substantially in registration with said loading manifold; a support for said transfer member; and means for revolving said support about the center of said loading manifold and said transfer member about the center for said circle of recesses.

10. A feeding mechanism comprising a loading device; means providing a plurality of horizontally fixed receivers disposed in spaced relation on a circle concentric with the center of said loading device; a transfer member supported for rotary movement about the center of said loading device, said transfer member having a plurality of article-receiving recesses disposed in spaced relation in a circle arranged tangent to and within the circle for said discharge stations, the circle for said recesses being of such diameter as to substantially cause the recesses to successively register with said loading device upon rotation of said transfer member, the chordal distance between adjacent recesses being equal to the chordal distance between adjacent receivers; means for simultaneously rotating said transfer member about the center of said loading device and about the center of the circle for said recesses; and guard means extending partially around said transfer member to retain articles in said recesses during movement from said loading device to said receivers.

References Cited in the file of this patent

UNITED STATES PATENTS

| Number | Name | Date |
|---|---|---|
| 450,276 | Winters | Apr. 14, 1891 |
| 1,032,157 | Petersen | July 9, 1912 |
| 1,308,208 | Troyer | July 1, 1919 |
| 2,069,897 | Nagy | Feb. 9, 1937 |
| 2,175,255 | Chapman | Oct. 10, 1939 |
| 2,200,844 | Johnson | May 14, 1940 |
| 2,348,464 | Geertsema | May 9, 1944 |

FOREIGN PATENTS

| Number | Country | Date |
|---|---|---|
| 527,921 | Germany | June 23, 1931 |